April 3, 1951        J. H. WERNIG        2,547,799
WINDOW MOUNTING

Filed April 16, 1947        2 Sheets-Sheet 1

Inventor
James H. Wernig
By
Spencer, Willits, Helmig & Baillio
Attorneys

April 3, 1951 J. H. WERNIG 2,547,799
WINDOW MOUNTING
Filed April 16, 1947 2 Sheets-Sheet 2

Inventor
James H. Wernig
By Spencer, Willits, Helmig & Baillio
Attorneys

Patented Apr. 3, 1951

2,547,799

UNITED STATES PATENT OFFICE 2,547,799

WINDOW MOUNTING

James H. Wernig, Detroit, Mich., assignor to General Motors Corporation, Detroit, Mich., a corporation of Delaware Application April 16, 1947, Serial No. 741,731

3 Claims. (Cl. 296—84)

In the automobile industry there is a trend away from flat windshield glass in favor of curved glass. Curved glass and particularly that curved in all directions or of compound curvature is difficult to produce accurately to precise specifications in quantity production and to enable large scale use of curved glass to be practical notwithstanding slight variations in the finished product it has been deemed desirable to revise current types of window mountings in a manner to accommodate or compensate for manufacturing inaccuracies.

With the foregoing in mind it is an object of the present invention to provide an improved windshield mounting which in a relatively inexpensive fashion affords a neat appearance and a firmly secured but cushioned connection without imposition of damaging stress on the fragile glass during installation and subsequent use. The connection furthermore is weatherproof without application of the usual messy sealing compounds and can be easily and quickly disassembled and reinstalled for simplifying service replacement of broken glass.

A further object of the invention is to enable simplification generally of the automobile structure and especially the frame about the windshield opening in that there needs to be formed merely a narrow marginal flange along the top of the sheet metal cowl, on the side posts and on the roof header and which marginal flange may be straddled by a rubber connector strip in the form of a loop embracing the edges of the glass with a central divider strip extending between top and bottom lengths of the loop and having associated with it a separable wedge insert which places the rubber under stress for a tighter and leakproof grip. For improved appearance and more particularly for concealing the spreader insert, both to reduce the likelihood of vandalism and theft, a polished ornamental molding is detachably secured in overlapping relation with the strip spreader and cooperates in imparting a pleasing smartness to the final assembly.

Figure 1:
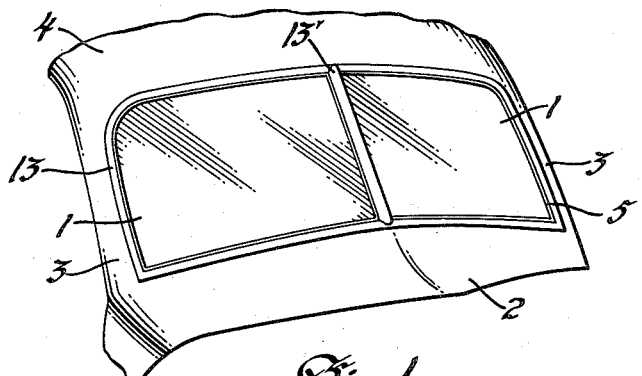
Figure 2:
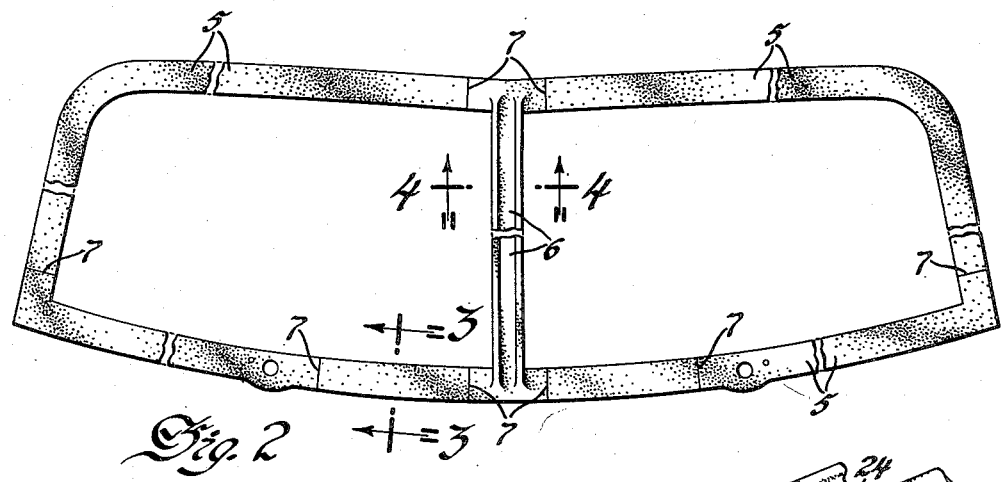
Figure 5:
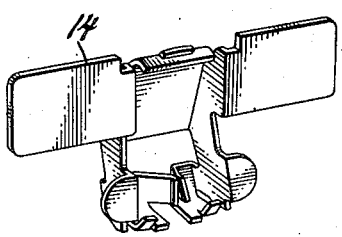
Figures 3, 4:
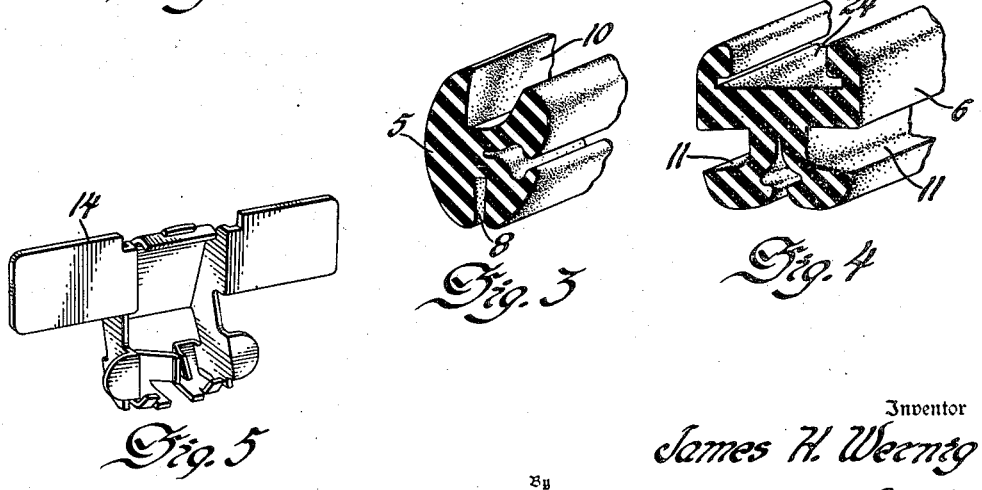
Figure 6:
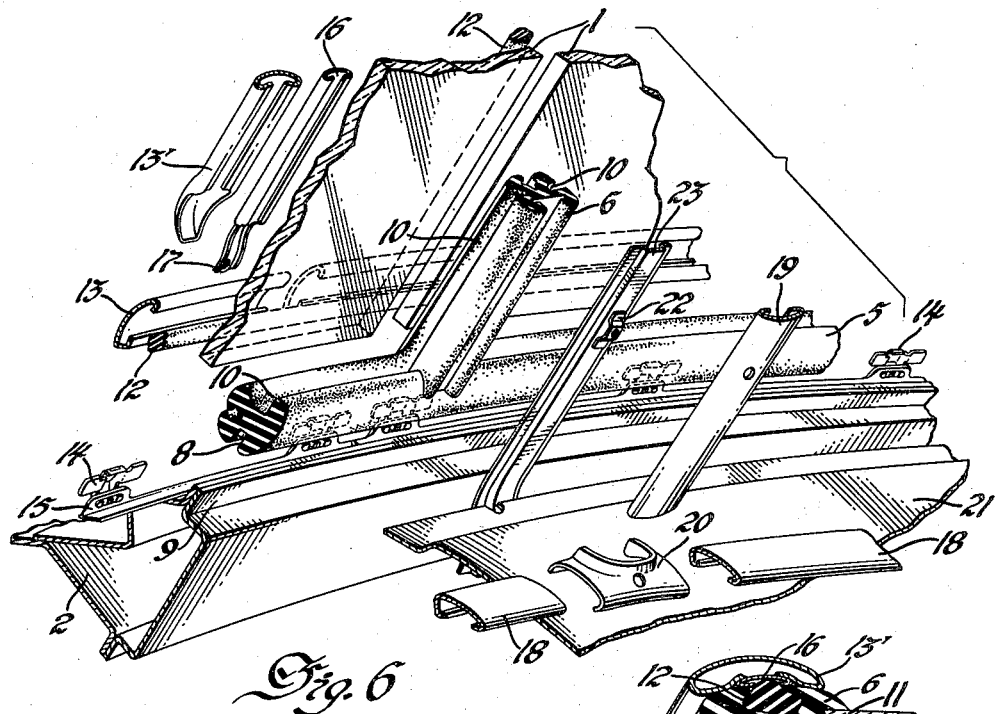
Figure 7:
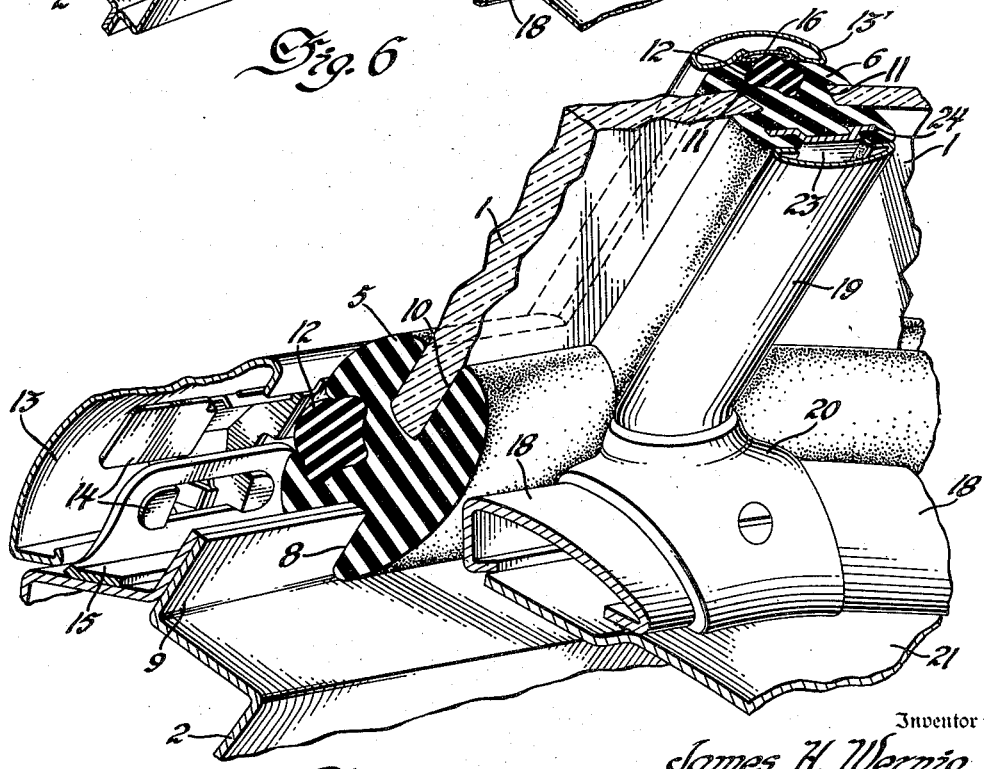

For a more detailed explanation reference will be made to the accompanying drawing wherein Figure 1 is a perspective view of a windshield portion of an automobile; Figure 2 is an elevation of a windshield connector prior to installation; Figures 3 and 4 are detail perspective views partly in section, as on lines 3—3 and 4—4, respectively, of Figure 2; Figure 5 is a perspective view of a suitable attachment clip for the detachable molding; Figure 6 is a perspective view showing fragments of the assembly in exploded relation and Figure 7 is an enlarged perspective view with parts in section at the central lower portion of the windshield.

In the drawing the windshield glass panels are indicated at 1—1 closing the opening in the frame afforded by the upper portion of the cowl structure 2, the side posts 3—3 and the forward edge or header of the roof 4. Supporting the closure panels 1—1 within the frame is an endless loop constituted as seen in Figure 2 by a pair of end and top and bottom strips, all indicated by the numeral 5 and of cross sectional shape as in Figure 3 together with a division strip 6 having its opposite ends joined to the top and bottom strips and being of cross sectional shape shown in Figure 4. In the bottom length of the loop there are preferably formed apertured enlarged portions for the reception therethough of conventional windshield wiper shafts. The connector strip is of a medium soft rubber and as here used the expression "rubber" is intended to include natural or synthetic rubber or any other comparable elastic deformable material. Either extruded or molded rubber will serve and it is proposed that the completed loop assembly comprise separately formed strips in end abutment with one another at the several lines of jointure indicated at 7—7 and preferably secured or otherwise permanently bonded together.

The unitary loop embraces the glass panels 1—1 and occupies the space between the adjacent edges of the panels and windshield frame. In its periphery the loop contains a longitudinally extending groove 8 to straddle the inwardly projecting frame flange 9 while the glass edge is located within the oppositely disposed inwardly opening channel 10. Adjacent side edges of the two glass panels are located within oppositely disposed channels 11—11 in the central divider strip 6. The substantial amount of rubber interposed between the spaced apart edges affords an effective insulator cushion to relieve stress and shock and its deformability compensates for irregularities and lack of uniformity in relative alignment of adjoining edges straddled by the strip.

In the installation the connector loop is first applied to the frame flange 9 and then the glass panels are fitted to their receiving grooves 10 and 11. The outermost groove lips are sufficiently flexible to enable them to be bent outwardly as the glass is pressed into place and to assist ease of installation each outermost lip as preformed should open outwardly initially as illustrated in Figure 3. In the final assembly relation the lips are bent toward a groove restricting relation and the neighboring region of the rubber is placed under stress to hug tightly both the glass and the mounting flange by reason of the insertion of an interlocking spreader strip 12 in a groove formed in the front face of each of the strips 5 and 6.

To reduce tampering and unauthorized removal of the spreader strip and yet enable its ready removal if glass replacement becomes necessary a concealing molding 13 is mounted exteriorly of the windshield as an ornamental window framing border. It may be formed in sections diverging outwardly and rearwardly from the center divider strip and in relation to the mounting flange 9 extends in spaced parallelism with it over the exposed face of the spreader strip 12 and closely bears against the connector strip 5. For convenience the molding 13 is of a removable snap on type and in section is of substantially C-shape with inturned opposite edges to be sprung over and behind retaining tabs or flanges carried by a series of spaced apart spring clips 14, each having hooked attachment legs projecting through receiving slots in upstanding ears on a mounting strip 15 welded to the windshield supporting frame. A molding retainer 16 overlies the spreader 12 in the central divider strip 6 and is removably secured in place at opposite ends by suitable attachment screws passing through holes, one of which can be seen at 17 in Figure 6. The snap on decorative molding 13' fits the retainer 16 and at its ends overlies the joint lines between the molding sections 13 along the top and bottom of the windshield.

Interior trim molding to cooperate in affording a more secure anchorage bears against and at least partially overlies the inside face of the connector loop and includes parts such as those numbered 18 and 19 together with suitable corner plates as at 20. The molding 18 along the top of the cowl cooperates with the front edge of the usual instrument supporting panel 21 and is held in place by fastening screws, not shown. Similar fastening screws for the molding strip 19 pass through the molding and into threaded engagement with nuts or threaded clips 22 carried by a mounting strip 23 whose opposite side edges are fitted into a T-shaped groove 24 in the rear face of the central divider strip 6. This mounting strip 23 serves to stiffen and locate the rubber divider strip of the loop connector and preferably is fastened at opposite ends to the windshield frame. It will be noted that the interior trim can remain in place and undisturbed during the glass replacement operations.

While the foregoing description has dealt specifically with the handling of curved windshield glass it will be understood that the invention is usable with flat plane glass and generally as a connector between various types of articles whose arrangement may be similar to that herein referred to.

What is claimed is:

1. In combination a pair of panels arranged in slightly spaced end to end relation, a connector strip of elastic deformable material disposed between the adjacent edges of said panels, rear, front, and side walls on said connector strip, said rear wall having a longitudinally extending groove therein, a rigid mounting strap extending into said groove, flange means integral with said connector strip and extending inwardly from the sides of said groove to overlap said strap and retain the connector thereto, each of said side walls having a longitudinally extending substantially U-shaped groove therein for receiving one edge of each of said panels respectively, said front wall having a longitudinally extending groove therein, said last mentioned groove having an enlarged interior for receiving an inwardly extending spreader, retaining means overlying both sides of said front wall groove, and a spreader mounted in said last mentioned groove to thereby, in cooperation with said rigid mounting strap, reduce the width of said U-shaped grooves and bring the walls thereof into tightly clamping engagement with the edges of said panels.

2. In a device of the class described, the combination of a frame having an opening therein, a panel for closing said opening, a rib on said frame extending into said opening, an elastic, deformable connector strip having a groove therein for receiving said rib and a second groove for receiving said panel, inner and outer faces on said connector strip said outer face having a groove therein, a spreader mounted in said last mentioned groove for urging the walls of said first and second mentioned grooves into clamping relation with said rib and panel respectively, a molding mounted in overlapping relation with said outer face of said connector and in shielding and protective relation with said spreader to block removal of the latter, and means for detachably securing said molding to said frame, said last mentioned means comprising retaining brackets mounted on said frame in spaced relation with said rib, and interlocking means on said bracket and molding for securing the latter in position.

3. In a device of the class described, the combination of a frame having an opening therein, a panel for closing said opening, a rib on said frame extending into said opening, an elastic, deformable connector strip having a groove therein for receiving said rib and a second groove for receiving said panel, inner and outer faces on said connector strip, said outer face having a groove therein, a spreader mounted in said last mentioned groove for urging the walls of said first and second mentioned grooves into clamping relation with said rib and panel, respectively, a molding mounted in overlapping relation with said outer face of said connector strip and in shielding and protective relation with said spreader to block removal of the latter, and means for detachably securing said molding to said frame, said last mentioned means comprising projections secured to said frame in spaced relation with said rib, retaining brackets detachably attached to said projections, flange means on said molding, and projecting means on said brackets adapted to interlock with said flanges to retain said molding in position.

JAMES H. WERNIG.

REFERENCES CITED

The following references are of record in the file of this patent:

UNITED STATES PATENTS

| Number | Name | Date |
|---|---|---|
| 1,961,352 | Hall | June 5, 1934 |
| 2,020,993 | Chamberlin | Nov. 12, 1935 |
| 2,077,604 | Wiley | Apr. 20, 1937 |
| 2,081,213 | Anibal | May 25, 1937 |
| 2,189,137 | Eichner | Feb. 6, 1940 |
| 2,242,746 | Dean | May 20, 1941 |
| 2,257,951 | Haberstump | Oct. 7, 1941 |
| 2,288,329 | Smith | June 30, 1942 |
| 2,388,297 | Slaughter | Nov. 6, 1945 |